Patented Dec. 20, 1949

2,491,553

UNITED STATES PATENT OFFICE 2,491,553

PREPARATION OF ALIPHATIC ACID ANHYDRIDES

Henry Dreyfus, deceased, late of London, England, by Claude Bonard, administrator, London, England, assignor to Celanese Corporation of America, a corporation of Delaware No Drawing. Application January 27, 1948, Serial No. 4,698. In Great Britain October 3, 1941

Section 1, Public Law 690, August 8, 1946
Patent expires October 3, 1961

9 Claims. (Cl. 260—546)

This invention relates to the production of aliphatic compounds and is more particularly concerned with the oxidation of aldehydes to the corresponding anhydrides.

In the oxidation of acetaldehyde with the object of recovering acetic anhydride as a final product of the process, the recovery of the acetic anhydride produced in the oxidation is rendered difficult by the fact that the acetic anhydride is very readily hydrolysed to acetic acid by the water simultaneously produced in the oxidation. Similar considerations apply in the oxidation of other aldehydes to the corresponding anhydrides, for instance, in the oxidation of propionaldehyde to propionic anhydride. The usual method of operation, consisting of removing the reaction product containing the anhydride together with the corresponding acid and water and usually unchanged aldehyde and catalyst and subjecting this mixture to distillation, results in loss of some of the anhydride originally present by its hydrolysis to acid. The present invention is concerned with an improvement in the process referred to, which produces very satisfactory results in suppressing the hydrolysis of the anhydride initially produced.

According to the invention, an aldehyde is oxidised to a corresponding anhydride in the presence of methylene chloride, the oxidation is carried out at such a temperature that the methylene chloride boils and forms an azeotropic mixture with the water formed in the oxidation, and the mixture is continuously removed from the reaction vessel. In carrying out the process, providing sufficient methylene chloride is always present, and it may, for instance, be continuously introduced as solvent medium for the aldehyde which must be supplied to the reaction vessel to replace that undergoing oxidation, the water produced in the oxidation is not allowed to accumulate and thus cannot reduce the yield of anhydride by hydrolysis. An additional advantage of the process accrues from the fact that the evaporation of solvent and water withdraws a considerable amount of heat from the reaction vessel. Since the reaction is strongly exothermic this feature is of considerable value in maintaining the reaction vessel at the desired temperature.

The production of acetic anhydride by the novel process can be carried out very effectively in a column. at the bottom of which oxygen is introduced and acetic anhydride and acetic acid are withdrawn, while fresh aldehyde and methylene chloride are introduced higher up the column and the vapours of methylene chloride and water are withdrawn from the top of the column and condensed, separated methylene chloride being returned for reuse in the process. Any unoxidised acetaldehyde contained in the effluent vapors and not dissolving in the condensed liquids can be absorbed, e. g. in methylene chloride which is to be return to the process. Catalyst withdrawn with the acetic anhydride-containing product can be replaced in the form of a solution in acetic acid introduced a short distance below the top of the column.

With less volatile aldehydes a similar arrangement can be used; but here, if desired, the aldehyde can be introduced higher up the column, e. g. together with the solution of fresh catalyst. It is to be noted that the invention may be applied with advantage generally to the production of distillable aliphatic anhydrides from the corresponding aldehydes and more particularly to the production of acetic, propionic and butyric anhydrides.

While the oxidation can be carried out using either oxygen itself or air or oxygen-enriched air as oxidising agent, it is preferred to employ oxygen itself, as the passage of the diluent nitrogen present in air and even oxygen-enriched air through the column is liable to interfere with the operation of the column and, moreover, to result in the carrying away of a substantial quantity of the aldehyde undergoing oxidation. Excellent results are obtained when using normal atmospheric pressure in the reaction zone, but, if desired, somewhat higher pressures can be maintained. No advantage appears to be gained by operating under reduced pressure. It is preferred that the zone in the column in which the reaction takes place, or at least a part of this zone, should be maintained at a temperature in the neighbourhood of 40–50° C. It is possible when operating in accordance with the process of the invention to use a reaction temperature substantially below this, but this is generally undesirable, owing to the danger of accumulating in the anhydride-containing product a dangerously high concentration of peracetic acid.

The catalyst employed in the process is preferably one which leads to a very rapid oxidation, and the use of a salt of copper, cobalt or nickel, and especially of a mixture of two or more of such salts, has been found preferable to the use of a manganese salt such as is usually employed for the manufacture of acetic acid by the oxidation of acetaldehyde. Salts of organic acids are very suitable, the lower fatty acid salts, e. g. acetates, propionates and butyrates, giving excellent results. Salts of aliphatic acids of higher molecular weight, e. g. laureates, palmitates, stearates, oleates or linoleates, may, however, be employed. The preferred catalyst consists of a mixture of copper and cobalt acetates containing 40–60% by weight of copper acetate and the remainder cobalt acetate. The quantity of catalyst used can be quite small, quantities equal to 0.02% to 2.00% of the weight of the aldehyde undergoing oxidation being sufficient.

The following examples illustrate the process of the invention:

Example 1

The apparatus employed comprises a distillation column provided with the usual dephlegmator and with heating means and a liquid draw-off in the still base; an oxygen inlet pipe terminating in a rose is situated in the still base a little above the draw-off, while inlet pipes are provided for introducing methylene chloride and acetaldehyde a few plates up from the bottom of the column and for introducing acetic acid containing dissolved catalyst a few plates from the top of the column.

In operation, the column is first charged with acetic acid, and heat is then applied to the base of the column, while introducing methylene chloride until a stable condition is arrived at with methylene chloride distilling off from the top at the same rate as that at which it is introduced. A continuous feed of acetic acid containing a mixture of equal parts by weight of cobalt acetate and copper acetate (the cobalt and copper acetates being together equal to 1% by weight of the acetic acid) is fed to the column whilst the draw-off is adjusted to maintain a constant level in the column. Continuous feeds of acetaldehyde and oxygen are then started, 100 parts of acetaldehyde being introduced for each 100 parts of acetic acid, the oxygen being introduced at such a rate that little escapes unused from the top of the column. The introduction of acetaldehyde and oxygen results in a rise in temperature in the column by reason of heat being developed in the oxidation of the acetaldehyde, and this rise in temperature is balanced by a reduction of the heating applied at the bottom of the column, while at the same time the reflux ratio is adjusted suitably to maintain distillation of the water produced in the oxidation as an azeotropic mixture with methylene chloride.

The azeotropic mixture distilling from the top of the column is condensed in a separating vessel, from which the methylene chloride layer is drawn off continuously for return to the process. The aqueous layer is flash-distilled for the recovery of unoxidised acetaldehyde, which is also returned to the process. The product withdrawn from the base of the column consists of acetic acid and acetic anhydride together with catalyst and substantially free from water or acetaldehyde. This product is distilled for the recovery of pure acetic anhydride.

Example 2

A mixture comprising equal parts by weight of propionaldehyde and propionic acid and containing 1% by weight on the propionaldehyde of a mixture of cobalt acetate and copper acetate is fed into the middle of a packed fractionating column equivalent to 25 theoretical plates, while at the same time gaseous oxygen and methylene chloride are introduced into the bottom of the column, the methylene chloride being introduced in quantity equal to about 7 times the weight of the propionaldehyde introduced at the same time. Heat is supplied by means of a steam coil in a re-boiler at the base of the column. Means are provided for recycling product from the base of the column to a point in the column at or near the point of introduction of the propionaldehyde/propionic acid mixture.

As reaction ensues, the water produced is vaporised together with methylene chloride and the vaporous azeotropic mixture passes upwards through the column and is withdrawn from the top, passed to a condenser and thence to a separating vessel, from which the methylene chloride layer is returned to the process, while the water layer is discarded.

When equilibrium is reached, a side stream of the propionic anhydride product is taken off from the recycle and distilled to obtain propionic anhydride free from propionic acid and catalyst. During the operation of the process, the heat applied at the base of the column and the reflux of methylene chloride to the top of the column are adjusted to ensure removal of the azeotropic mixture of methylene chloride and water only.

Having described the invention, what is desired to secure by Letters Patent is:

1. Process for the manufacture of an aliphatic anhydride by subjecting the corresponding aldehyde to catalytic oxidation with gaseous oxygen, which comprises maintaining methylene chloride present in the reaction zone throughout the oxidation and distilling off water produced as an azeotropic mixture with methylene chloride during the progress of the oxidation.

2. Process for the manufacture of an aliphatic anhydride by subjecting the corresponding aldehyde to catalytic oxidation with gaseous oxygen, which comprises effecting the oxidation in presence of methylene chloride and, during the progress of the oxidation, distilling off water produced as an azeotropic mixture with methylene chloride, and introducing into the reaction zone methylene chloride to replace that so removed and fresh aldehyde to replace that oxidized.

3. Process for the manufacture of acetic anhydride by subjecting acetaldehyde to catalytic oxidation with gaseous oxygen, which comprises maintaining methylene chloride present in the reaction zone throughout the oxidation and distilling off water produced as an azeotropic mixture with methylene chloride during the progress of the oxidation.

4. Process for the manufacture of acetic anhydride by subjecting acetaldehyde to catalytic oxidation with gaseous oxygen, which comprises effecting the oxidation in presence of methylene chloride and, during the progress of the oxidation, distilling off water produced as an azeotropic mixture with methylene chloride, and introducing into the reaction zone methylene chloride to replace that so removed and fresh aldehyde to replace that oxidized.

5. Process for the manufacture of acetic anhydride by subjecting acetaldehyde to catalytic oxidation with gaseous oxygen in a column, which comprises, during the progress of the oxidation, introducing oxygen into the bottom of the column and acetaldehyde and methylene chloride near the bottom, introducing acetic acid containing the catalyst near the top of the column, and removing overhead an azeotropic mixture of methylene chloride and water produced in the oxidation.

6. Process for the manufacture of propionic anhydride by subjecting propionaldehyde to catalytic oxidation with gaseous oxygen, which comprises maintaining methylene chloride present in the reaction zone throughout the oxidation and distilling off water produced as an azeotropic mixture with methylene chloride during the progress of the oxidation.

7. Process for the manufacture of propionic anhydride by subjecting propionaldehyde to catalytic oxidation with gaseous oxygen, which comprises effecting the oxidation in presence of methylene chloride and, during the progress of the oxidation, distilling off water produced as an azeotropic mixture with methylene chloride, and introducing into the reaction zone methylene chloride to replace that so removed and fresh aldehyde to replace that oxidized.

8. Process for the manufacture of propionic anhydride by subjecting propionaldehyde to catalytic oxidation with gaseous oxygen in a column, which comprises, during the progress of the oxidation, introducing propionaldehyde together with propionic acid and the catalyst near the middle of the column, introducing oxygen and methylene chloride near the bottom of the column, and removing overhead an azeotropic mixture of methylene chloride and water produced in the oxidation.

9. Process according to claim 8, wherein the contents of the column are recycled from the bottom thereof to about the middle thereof, a portion of the recycled liquid being withdrawn for the recovery of propionic anhydride therefrom.

CLAUDE BONARD,
*Administrator of the Estate of Henry Dreyfus, Deceased.*

REFERENCES CITED

The following references are of record in the file of this patent:

UNITED STATES PATENTS

| Number | Name | Date |
|---|---|---|
| 2,403,769 | Tuerck et al. | July 9, 1946 |

FOREIGN PATENTS

| Number | Country | Date |
|---|---|---|
| 443,151 | Great Britain | of 1936 |